UNITED STATES PATENT OFFICE 2,503,119

SOLVENT EXTRACTION

Art C. McKinnis, Long Beach, Calif., assignor to Union Oil Company of California, Los Angeles, Calif., a corporation of California No Drawing. Application June 19, 1945,
Serial No. 600,413

5 Claims. (Cl. 260—644)

This invention relates to a method of solvent extraction and particularly to an improved solvent for the separation, by solvent extraction, of relatively polar compounds from relatively non-polar compounds in mixtures therewith.

In many industrial processes mixtures of relatively polar compounds and relatively non-polar compounds commonly occur which must be resolved into their constituents in the operation of these processes. For example, in the azeotropic distillation of complex organic fractions an azeotropic distillate is obtained which will quite often comprise such a polar-non-polar mixture. Thus, for example, in the azeotropic distillation of an alcohol-ketone fraction with halogenated hydrocarbons an azeotrope is obtained consisting of alcohol and the halogenated hydrocarbon. Many instances of this type of binary mixture, occurring in the process of azeotrope distillation, exist.

Similar polar-non-polar fractions may occur in the processes of solvent extraction and extractive distillation wherein either the extractive solvent or the extract may be a polar compound. Further, in many types of chemical synthesis such mixtures often result in the end products from the synthesis. Thus, for example, in the oxidation or hydration of hydrocarbons, both polar and non-polar components will be found in the resulting products.

In many cases these mixtures of polar and non-polar compounds may be resolved by simple distillation providing the difference between the boiling points of the components permit. However, in those cases where separation by distillation is not feasible it is necessary to resort to solvent extraction, azeotropic distillation or the like. In this regard water has found widespread application as a solvent for extracting the water soluble polar compounds from relatively water insoluble non-polar compounds. However, water extraction is often complicated or even impossible as a result of such related and interfering factors as:

1. The boiling point of water which may be so close to that of the extracted component or components that separation by distillation is not practical.

2. The extracted material may react chemically with water resulting in excessive loss of the extract.

3. The extracted material may be corrosive in water.

4. The solubility in water of the relatively polar components may be so small that excessive amounts of water are required or in some cases the compound to be extracted may be virtually insoluble in water.

In some instances these difficulties have been overcome by employing an organic solvent other than water such as an alcohol, ketone or the like. However, if such procedure be employed, difficulties often arise as a result of the resultant increased solubility of the relatively non-polar compounds of the mixture in the organic extractive solvent. Whereas the majority of polar organic solvents exhibit a high solvent power for polar compounds, a great many of these solvents possess sufficiently high solvent power for non-polar compounds to make a separation of polar compounds from non-polar compounds by means of solvent extraction with such solvents difficult. Thus in the separation of methyl nitrite from butane the alcohols are unsatisfactory solvents for solvent extraction because of the comparatively high solubility of butane in alcohol.

It is the primary object of my invention to provide a class of solvents for the separation of relatively polar compounds from relatively non-polar compounds which solvents are so prepared that the relatively non-polar compounds are comparatively insoluble therein and which are readily separable from the relatively polar compounds extracted.

It is a further object of my invention to provide a class of solvents fulfilling these foregoing ends which are economical and simple to employ.

Yet another object of the invention is to provide a process for the solvent extraction of relatively polar compounds from relatively non-polar compounds employing the solvents herein described.

Other objects and advantages of my invention will become apparent to those skilled in the art as the description thereof proceeds.

I have found in those cases where water is not a satisfactory solvent for the separation of polar compounds and non-polar compounds and where difficulties arise in the use of other organic solvents due to the undesirably high solubility of the relatively non-polar compounds in the organic solvent that by dissolving a metal salt in the organic solvent the solubility of the non-polar compounds in the solvent will be materially decreased and the resultant separation will be correspondingly improved.

I have found that any metal salt which is soluble in the solvent to be employed has the effect of decreasing the solubility of the non-polar compounds in these solvents. However, the alkali and alkaline earth metal halides, phosphates, sulfates and nitrates such as calcium chloride, sodium nitrate, potassium sulfate, lithium chloride and the like and the alkali and alkaline earth metal salts of the organic acids such as sodium acetate, lithium carbonate, ammonium lactate, barium carbonate, barium acetate, calcium acetate, sodium formate, ammonium acetate and the like are the preferred salts for this usage inasmuch as the effect of these salts in inhibiting the solubility of the non-polar compounds in the organic solvents is more pronounced than that of the other salts. These salts or any metal salt may be employed in the organic solvent in any proportions up to complete saturation providing that complete saturation represents not more than about 50% to 60% of the salt in the solution. Thus I may use from about 1% to about 50% to 60% of the salts in the solvent dependent only upon the desired extraction and on the solubility of the salt in the solvent.

I may employ for this type of separation any organic compound in which the polar component or components of the mixture to be separated are soluble and in which a metal salt may be dissolved. Further in view of the importance of subsequent separation of the organic solvent-salt solution from the polar compound extracted, it is preferable to employ an organic solvent which boils above the boiling point of the polar components of the mixture and which does not form azeotropes therewith. Although such limitations are not essential to the invention, if they are observed they permit simple separation, by conventional fractional distillation, of the extract and the solvent leaving as residue from the distillation the solvent salt solutions. Organic solvents boiling below the polar component to be extracted may also be employed without departing from the principles of my invention. If such lower boiling solvent be employed, however, the separation of the polar compound from the solvent becomes more difficult inasmuch as the lower boiling solvent will be separated in the distillation from the polar extract and it is then necessary to further separate the polar extract from the salt and recombine the latter with the organic solvent.

The solvents which I have found to be particularly applicable to the process of this invention include alcohols such as methyl alcohol, ethyl alcohol, normal propyl alcohol, isopropyl alcohol and the like; glycols such as glycol, propylene glycol, trimethylene glycol and the like; ketones such as acetone, methyl ethyl ketone, diethyl ketone, methyl propyl ketone, methyl isopropyl ketone and the like; esters such as methyl formate, ethyl acetate, normal propyl acetate, methyl propionate, ethyl butyrate, ethyl nitrate, normal butyl nitrate and the like; amides such as acetamide, formamide, propionamide and the like; and nitriles such as formonitrile, acetonitrile, propanenitrile and the like. Any of these compounds or mixtures thereof may be employed, the choice of which will depend upon the particular components to be separated, the boiling points of these components and upon the relative solubility of the desired metal salt or salts in the solvent. In regard to the last of these qualifications the solvents containing the hydroxyl group such as the alcohols and glycols are preferred because of their relatively high solvent power for a wide range of metal salts.

The application and advantages of my invention may be more easily understood by reference to various polar-non-polar systems. Upon examination of the system butane and methyl nitrite which occurs in the azeotropic distillation of a C-4 hydrocarbon fraction with methyl nitrite it is found that although methyl nitrite is appreciably more soluble in water than is butane it is not sufficiently so to enable the use of a low solvent-oil ratio. It might appear that this condition could be remedied by addition of methyl alcohol to the water which has the effect of greatly increasing the solubility of the methyl nitrite without seriously increasing the solubility of the butane. However, it is found that any water-methyl alcohol solution will hydrolyze methyl nitrite at the relatively high distillation temperatures required for resolution of the solvent-methyl nitrite mixture resulting, causing an appreciable loss of methyl nitrite and the formation of extremely corrosive vapors, nitrous acids and methyl alcohol being the products of hydrolysis. Moreover, water free methyl alcohol cannot be used practically since it is miscible with butane thus preventing its use in a solvent extraction process. Further, other oxygenated compounds are not suitable since at elevated temperatures they react with the methyl nitrite in a manner which may be represented by the following reaction between methyl nitrite and ethyl alcohol.

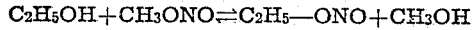

$$C_2H_5OH + CH_3ONO \rightleftharpoons C_2H_5-ONO + CH_3OH$$

This difficulty is overcome by saturating methyl alcohol with calcium chloride which causes a phase separation between the butane and methyl alcohol whereas the methyl nitrite remains completely miscible in the methyl alcohol calcium chloride solution thus permitting the separation by simple solvent extraction of the butane and methyl nitrite.

*Example*

In a specific example of the process a mixture of 50 volumes of ethyl alcohol and 50 volumes of methyl ethyl ketone was azeotropically distilled with 257 volumes of dichloroethane to obtain an azeotropic distillate comprising approximately 41% alcohol and 59% of the dichloroethane. Water extraction of this alcohol-halogenated hydrocarbon mixture was undesirable because of the formation of an unseparable water-alcohol azeotrope in the extraction. However, the use of other polar organic solvents gave rise, as pointed out above, to difficulties due to the solubility of the dichloroethane in these solvents. This mixture was, however, effectively separated by employing a glycol-sodium acetate solution whereby the solubility of the dichloroethane in the glycol was materially reduced by the presence of the salt thereby permitting the separation of the ethyl alcohol from the dichloroethane.

The separation was accomplished in the present example by simple agitation of the alcohol-dichloroethane mixture in the presence of an equal volume of the glycol-sodium acetate solvent. A phase separation occurred between the alcohol-solvent phase and the insoluble dichloroethane phase showing a very favorable partition factor, the dichloroethane phase after only one batchwise contact containing less than 5% of alcohol. The extracted alcohol was readily separated from the glycol-sodium acetate solvent by simple fractional distillation and the final alcohol product contained only a trace of dichloroethane. Continuous countercurrent extraction is decidedly more efficient than the batchwise extraction and no difficulty is experienced in obtaining substantially pure extract and raffinate fractions employing the solvents according to the present invention.

While I have described my invention with reference to the preceding illustrations inasmuch as such mixture may occur in commercial operation, my invention is not limited to the separation of these particular mixtures. Furthermore, although emphasis hs been placed upon the separation of relatively polar compounds from relatively non-polar compounds which is difficult to accomplish by conventional methods, it is within the scope of my invention to employ the novel solvents herein described for the separation of any such mixtures inasmuch as in actuality the process of my invention is in many cases superior to conventional methods even when the latter may be applicable.

I have found that this process is particularly applicable to those instances in which a hydrocarbon constitutes the relatively non-polar component of the mixture, the butane-methyl nitrite mixture being a good sample of this type. Mixtures of hydrocarbons with alcohols, ketones, and other polar compounds frequently result in various commercial processes and to the end of improving the art in the separation of such mixtures my invention is particularly directed.

Realizing that many modifications and additions to my invention may occur to those skilled in the art without departing from the spirit or scope thereof, I claim:

1. A process for separating a hydrocarbon from an organic nitrite which comprises extracting a mixture of said compounds with a solvent to dissolve the organic nitrite, leaving the hydrocarbon undissolved, said solvent consisting of a saturated polar oxygenated organic compound different from said organic nitrite, having a boiling point different from said organic nitrite and containing a dissolved salt of a metal selected from the class consisting of the alkali and alkaline earth metals and separating the extracted organic nitrite from said solvent-salt solution.

2. A process for separating a non-polar hydrocarbon from a saturated organic nitrate which comprises extracting a mixture of said compounds with a solvent to dissolve said nitrite, leaving said hydrocarbon undissolved, said solvent consisting of a saturated alcohol having a boiling point different from said nitrite and containing a dissolved salt of a metal selected from the class consisting of the alkali and alkaline earth metals and separating the extracted organic nitrite from said alcohol-salt solution.

3. A process for separating butane from methyl nitrite which comprises extracting a mixture of butane and methyl nitrite with methyl alcohol containing dissolved calcium chloride to dissolve the methyl nitrite, leaving butane undissolved and separating the extracted methyl nitrite from its solution in methyl alcohol containing dissolved calcium chloride.

4. A process for separating a hydrocarbon from an organic nitrite which comprises extracting a mixture of said compounds with a solvent to dissolve the organic nitrite, leaving the hydrocarbon undissolved, said solvent consisting of a saturated polar oxygenated organic compound selected from the class consisting of alcohols, glycols, ketones and esters, having a boiling point different from said organic nitrite and containing a dissolved salt of a metal selected from the class consisting of the alkali and alkaline earth metals and separating the extracted organic nitrite from said solvent-salt solution.

5. A process according to claim 4 in which said dissolved salt is a calcium salt.

ART C. McKINNIS.

REFERENCES CITED

The following references are of record in the file of this patent:

UNITED STATES PATENTS

| Number | Name | Date |
|---|---|---|
| 1,055,514 | Buer | Mar. 11, 1913 |
| 1,474,216 | Ruymbeke | Nov. 13, 1923 |
| 2,081,189 | Wiezevich | May 25, 1937 |
| 2,246,257 | Kohn | June 17, 1941 |
| 2,307,953 | Potter | Jan. 12, 1943 |
| 2,360,655 | Deanesly | Oct. 17, 1944 |

FOREIGN PATENTS

| Number | Country | Date |
|---|---|---|
| 310,623 | Great Britain | May 2, 1929 |

OTHER REFERENCES

McArdle, "Solvents in Synthetic Organic Chemistry," 1925, the chapter on "Salting Out," pages 158–167.